Aug. 5, 1947.  H. E. PAGE  2,425,071
REMOTE CONTROL APPARATUS FOR HYDRAULIC SYSTEMS
Filed Jan. 11, 1944  2 Sheets-Sheet 1

INVENTOR.
Herbert E. Page
BY
Atty.

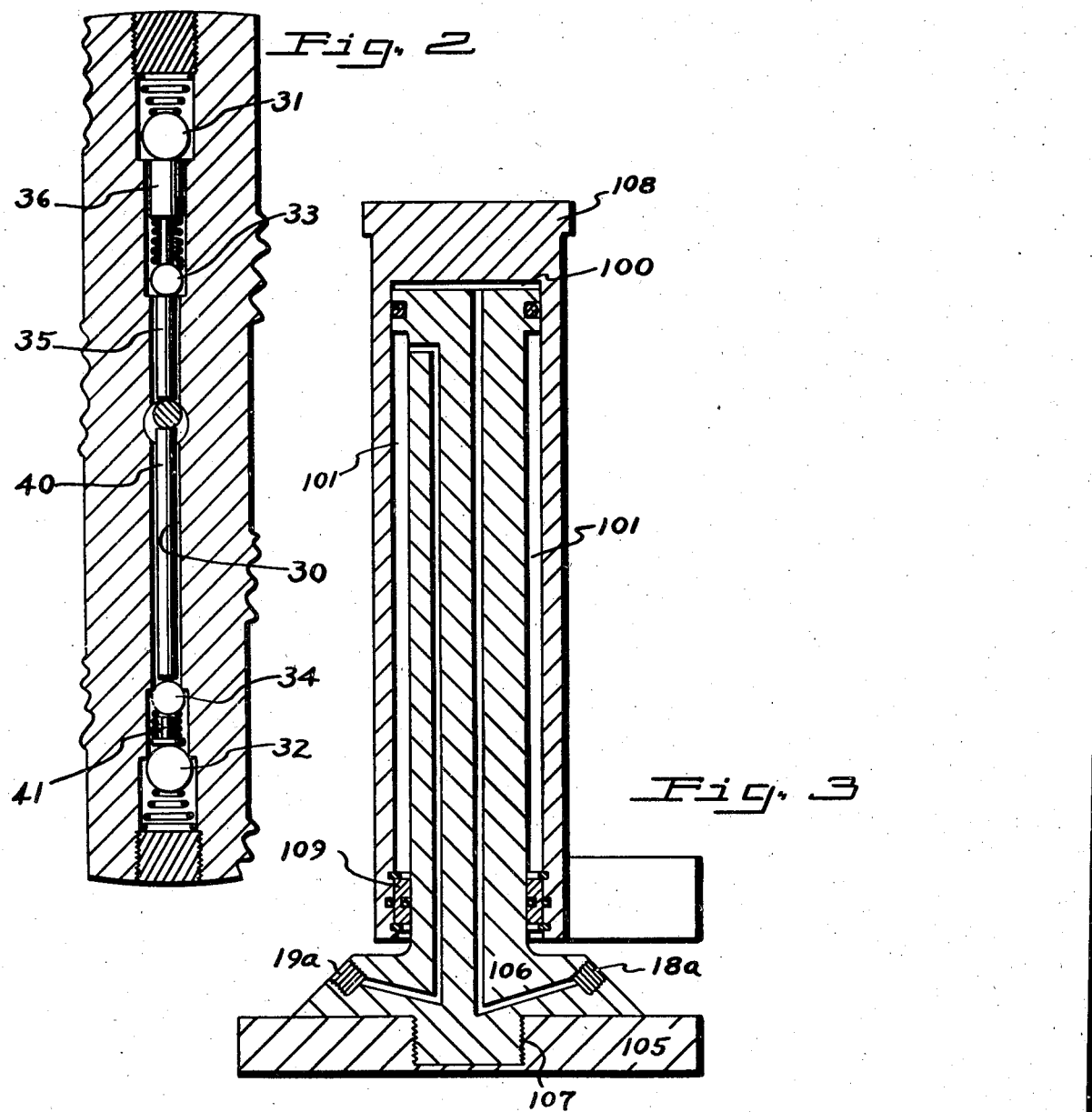

Patented Aug. 5, 1947

2,425,071

UNITED STATES PATENT OFFICE 2,425,071

REMOTE CONTROL APPARATUS FOR HYDRAULIC SYSTEMS

Herbert E. Page, Pasadena, Calif.

Application January 11, 1944, Serial No. 517,807

6 Claims. (Cl. 60—52)

This invention relates to hydraulic pressure multiplying systems. In its more particular application it has to do with means for generating and supplying hydraulic pressure to apparatus located at a remote point.

It is one of the objects of my invention to provide a device of this character wherein the pressure may be applied in a plurality of stages at different volume-pressure ratios to differing loads encountered by the ram or other pressure-actuated elements, so that not only maximum speed of operation is accomplished, but also the more favorable ratio provided when the greater load is encountered provides a mechanical advantage in that the load may be lifted by a minimum of pumping effort.

Other subordinate objects and corresponding advantages are inherent in my invention and how those as well as the principal aims are carried out will be fully understood from the following detailed explanation of one of the embodiments by which the invention is capable of being practiced. For purposes of the description I shall refer to the accompanying drawings, in which:

Fig. 2 is a section on line 2—2 of Fig. 1; and

Fig. 3 is a medial vertical section of a ram element.

Figure 1:
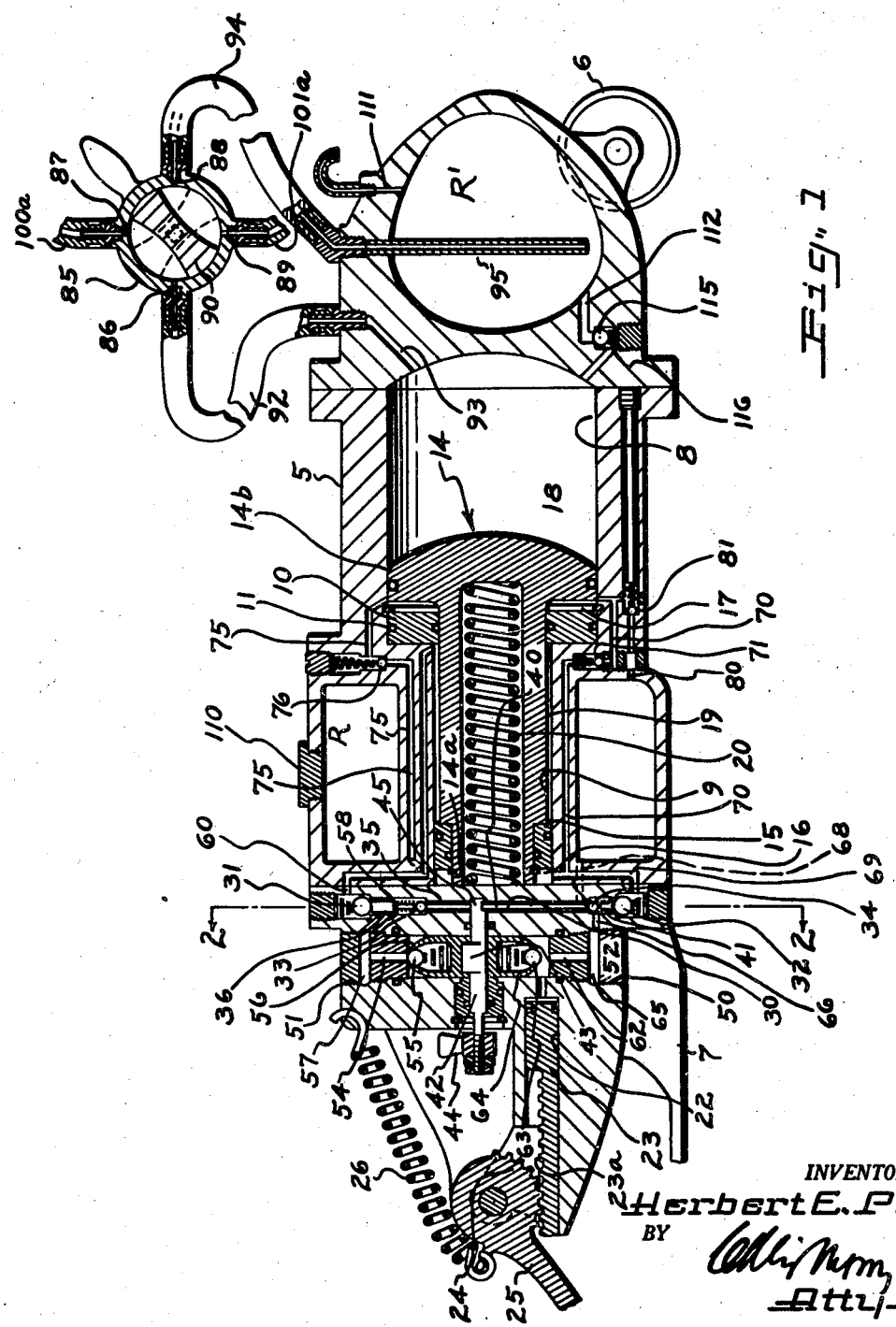
Fig. 1 is a medial section.

In the drawings I show at 5 a body mounted on wheels 6 and having feet 7 at the other end, the feet also acting as handles when it is desired to move the body from one place to another.

The body provides a pair of cylinders 8 and 9 of relatively different diameters, separated by a guide ring 10 carrying seal rings 11. A piston 14, having a relatively small diameter outer end portion 14a and a relatively larger diameter inner end portion 14b, reciprocates in the cylinders and through ring 10, being provided with a seal collar 15 adjacent its inner end. The construction thus described provides pressure chambers 16, 17, 18 and 19. A coil spring 20 mounted in a longitudinal bore in piston 14 urges the piston to the right or into chamber 18 when the spring is not compressed by fluid pressure as will be hereinafter described. Fluid reservoirs R and R' are provided in the body.

Another cylinder 22 is provided in the body to reciprocally receive pumping piston 23 whose outer end is in the form of a rack 23a operated by a pinion member 24 carried by lever 25. The lever is urged in one direction by a spring 26. A valve bore 30 provides seats for valves 31, 32, 33, 34, each of the valves being urged seated by a spring. Valves 31, 33 are movable off their seats by a rod 35, which rod bears at one end directly against valve 33 and in turn the unseating movement of valve 33 is transmitted to valve 31 by a slidable rod 36. Valves 32, 34 are movable off their seats by rod 40, which rod bears at one end directly against valve 34 and unseating movement of valve 34 is transmitted to valve 32 by means of a slidable rod 41. Rods 35, 40 are alternately moved by a cam 45 carried by shaft 42, which shaft also carries another cam 43 and is operable by a handle 44.

A transverse bore 50 receives screw threaded plugs 51, 52. Plug 51 has a longitudinal bore 54 providing a seat for spring pressed ball valve 55 carried in a cage 56, and a transverse port 57 which communicates through port 58 with the valve bore 30 between valves 31, 33. A port 60 provides communication between the bore 30, above valve 31, and chamber 19 for the purpose to be described.

Plug 52 has a longitudinal bore 62 providing a seat for spring pressed ball valve 63 carried in cage 64, and a transverse port 65 communicating through bore 66 with valve bore 30 between valves 34 and 32. A port 68 provides communication between the bore 30, above valve 34, and the reservoir R, and the port 69 provides communication between bore 30, below valve 32, and chamber 16. Another port 70 communicates with chamber 17, the port being controlled by a check valve 71 seating towards chamber 17.

A port 75 communicates between chambers 16 and 17, being controlled by a check valve 76 seating towards chamber 16.

A port 80 provides communication between the reservoir R and chamber 17, being controlled by a check valve 81 seating towards the reservoir, this port being for the purpose of supplying make-up fluid to chamber 17 as will be hereinafter described.

A cylindrical valve body 85 has four ports 86, 87, 88, 89 and rotatably carries a valve member 90 for simultaneously opening or closing pairs of the ports. Port 86 is connected, as by flexible tube 92, with chamber 18 through port 93, and port 88 is connected to reservoir R' through tubes 94, 95. Ports 87, 89 are connected to chambers 100, 101, respectively, of a ram element to be described, by means of flexible tubes 100a, 101a. While I particularly show a ram such as may be utilized in a hydraulic jack, it will be understood that my system is applicable to any hydraulic pressure utilizing apparatus.

The ram element comprises a base 105 to which a piston member 106 is stationarily secured, as by the threads 107. A cylinder 108 fits over and is slidable relative to the piston, carrying a guide ring 109 which, together with the cylinder side wall and the enlarged top end of the piston, defines pressure chamber 101.

A threaded plug 110 normally closes a filling port connecting with the reservoir R and reservoir R' is vented to atmosphere through port 111. Reservoir R' also communicates with chamber 18 through port 112 controlled by a ball check valve 115 seating towards the reservoir.

Operation of the system is as follows: In the position which the parts occupy in the drawings, cams 43 and 45 have been rotated to open valves 31, 33 and to close valve 55. In this position pressure is released from chamber 19 through port 60, bore 30 and port 68 into the reservoir R permitting spring 20 to initially move piston 14 to the right, forcing fluid from chamber 18 through port 93, tube 92, valve ports 86, 87, and tube 100a into chamber 100 of the ram member, to initially raise the ram 108 into contact with the work to be lifted or pressed. The drawings illustrate the position of the piston 14 immediately before that initial movement has taken place under the influence of the spring 20. After contacting the load, the next stage of lifting pressure is applied in chamber 16 by reciprocation of piston 23, as follows: On each outward or suction stroke of the piston 23, fluid is drawn into cylinder 22 from reservoir R through ports 62, 65, 66, past check valve 34, and on each pressure stroke of the piston the fluid is forced into chamber 16 through ports 62, 65, 66, 69 past check valve 32. During the above-described outward movement of piston 14, make-up fluid will be drawn from the reservoir into chamber 17 by the vacuum created in said chamber, through port 80, past check valve 81 therein. If and when the load on the ram is sufficiently increased to create enough presure in chamber 16 to unseat valve 76, fluid will then, on each pressure stroke of piston 23, be forced also into chamber 17. Thus, there is a three-stage pressure application, being first the pressure of spring 20, next the pressure in chamber 16, and next the pressure in both chambers 16 and 17.

When it is desired to lower the load lifted by the ram 108, handle 44 is rotated 180° to rotate cams 43 and 45 from the illustrated position, which will move valves 34, 32 off their seats, will allow valve 55 to move off its seat, and will move valve 63 against its seat. Thus, fluid pressure in chamber 17 will be released, the fluid therein returning to reservoir R through ports 70 and 68. This will also permit fluid in chamber 100 to return to chamber 18. If, through loss of fluid, a vacuum remains in chamber 18 after ram 108 has returned to the position of Fig. 3, the spring 116 holding check valve 115 seated in port 112 will yield to permit fluid to be drawn from reservoir R'. Of course, the initial return movement of the piston 14 will cease when the load is fully lowered, so that in order to fully return the piston 14 to the illustrated position, fully compressing spring 20, it will be necessary to operate handle 25, reciprocating piston 23 to force fluid through ports 54, 57, 58 and 60 into chamber 19, and such movement of piston 14 will further draw fluid from ram chamber 100 into chamber 18. During downward movement of ram 108 in its return to the position illustrated in Fig. 3, make-up fluid will be drawn into chamber 101 from reservoir R' through tubes 94, 101a. Also, if it be necessary or desirable to utilize fluid pressure to move the ram 108 from such extended position to the position illustrated in Fig. 3, this may be done by turning the cams 43, 45 180° from the position last described, thus moving them back to the position shown in Fig. 1, and moving valve 90 to the dotted line position of Fig. 1, which places chamber 18 in communication with ram chamber 101 and places chamber 100 in communication with reservoir R'. Then operation of the lever 25 will force liquid from chamber 18 into chamber 101 and make-up fluid will be drawn into chamber 100 from reservoir R'. When the valve 90 is moved back to the full line position of Fig. 1, pressure is released in chamber 101 and on the next upward movement of the ram 108 the fluid in chamber 101 will be returned to reservoir R'.

I claim:

1. Hydraulic apparatus comprising, in combination, a pressure-actuated device having a body, a piston reciprocable relative to the body, said body providing a pair of pressure chambers to which opposed pressure-receiving areas of the piston are respectively exposed, and a remote control unit including a body presenting a cylinder, a first and a second fluid reservoir and a fluid chamber, a fluid-passing line providing communication between the fluid chamber and one of the pressure chambers, a fluid-passing line providing communication between the second reservoir and the other pressure chamber, valve means controlling said lines, a work piston reciprocably mounted in the cylinder for movement into and out of the fluid chamber and defining with the cylinder a first pressure chamber and a second annular pressure chamber, said piston having pressure-receiving surfaces of different areas exposed to the respective last-named pressure chambers, a fluid pressure-generating pump, fluid-passing lines respectively providing communication between the pump and the first reservoir during each suction stroke of the pump and between the pump and the first pressure chamber on pressure strokes of the pump, a fluid passage establishing communication between the first and second pressure chambers, and a valve controlling the last-named passage, said valve being openable in response to predetermined fluid pressure in the said first pressure chamber.

2. Hydraulic apparatus comprising, in combination, a pressure-actuated device having a body, a piston reciprocable relative to the body, said body providing a pair of pressure chambers to which opposed pressure-receiving areas of the piston are respectively exposed, and a remote control unit including a body presenting a cylinder, a first and a second fluid reservoir and a fluid chamber, a fluid-passing line providing communication between the fluid chamber and one of the pressure chambers, a fluid-passing line providing communication between the second reservoir and the other pressure chamber, valve means controlling said lines, a work piston reciprocably mounted in the cylinder for movement into and out of the fluid chamber and defining with the cylinder a first pressure chamber and a second annular pressure chamber, said piston having pressure-receiving surfaces of different areas exposed to the respective last-named pressure chambers, a fluid pressure-generating pump, fluid-passing lines respectively providing communication between the pump and the first reservoir during each suction stroke of the pump and between the pump and the first pressure chamber on pressure strokes of the pump, a fluid passage establishing communication between the first and second pressure chambers, a valve controlling the last-named passage and being openable in response to predetermined fluid pressure in the first pressure chamber, a fluid passage establishing communication of the second pressure chamber with the first reservoir, and a check valve in the last-named passage seating towards the first reservoir whereby to be unseated in response to vacuum in the second pressure chamber.

3. Hydraulic apparatus comprising, in combination, a pressure-actuated device having a body, a piston reciprocable relative to the body, said body providing a pair of pressure chambers to which opposed pressure-receiving areas of the piston are respectively exposed, and a remote control unit including a body presenting a cylinder, a first and a second fluid reservoir and a fluid chamber, a fluid-passing line providing communication between the fluid chamber and one of the pressure chambers, a fluid-passing line providing communication between the second reservoir and the other pressure chamber, valve means controlling said lines, a work piston reciprocably mounted in the cylinder for movement into and out of the fluid chamber and defining with the cylinder a first and a second pressure chamber, said piston having pressure-receiving surfaces of different areas exposed to the respective last-named pressure chambers, a fluid pressure-generating pump, fluid-passing lines respectively providing communication between the pump and the first reservoir during each suction stroke of the pump and between the pump and the first pressure chamber on pressure strokes of the pump, a fluid passage establishing communication between the first and second pressure chambers, a valve controlling the last-named passage and being openable in response to predetermined fluid pressure in the first pressure chamber, a fluid passage establishing communication between the second reservoir and the fluid chamber and a check valve controlling said last-named passage, said check valve seating towards the second reservoir.

4. Hydraulic apparatus comprising, in combination, a pressure-actuated device having a body, a piston reciprocable relative to the body, said body providing a pair of pressure chambers to which opposed pressure-receiving areas of the piston are respectively exposed, and a remote control unit including a body presenting a cylinder, a first and a second fluid reservoir and a fluid chamber, a fluid-passing line providing communication between the fluid chamber and one of the pressure chambers, a fluid-passing line providing communication between the second reservoir and the other pressure chamber, valve means controlling said lines, a work piston reciprocably mounted in the cylinder for movement into and out of the fluid chamber and defining with the cylinder a first pressure chamber and a second annular pressure chamber, said piston having pressure-receiving surfaces of different areas exposed to the respective last-named pressure chambers, a fluid pressure-generating pump, fluid-passing lines respectively providing communication between the pump and the first reservoir during each suction stroke of the pump and between the pump and the first pressure chamber on pressure strokes of the pump, a fluid passage establishing communication between the first and second pressure chambers, a valve controlling the last-named passage and being openable in response to predetermined fluid pressure in the first pressure chamber, and hydraulic means cooperating with the piston to move the piston outwardly of the fluid chamber.

5. Hyraulic apparatus comprising, in combination, a pressure-actuated device having a body, a piston reciprocable relative to the body, said body providing a pair of pressure chambers to which opposed pressure-receiving areas of the piston are respectively exposed and a demote control unit including a body presenting a cylinder, a first and a second fluid reservoir and a fluid chamber, a fluid-passing line providing communication between the fluid chamber and one of the pressure chambers, a fluid-passing line providing communication between the second reservoir and the other pressure chamber, valve means controlling said lines, a work piston reciprocably mounted in the cylinder for movement into and out of the fluid chamber and defining with the cylinder a first and a second pressure chamber, said piston having pressure-receiving surfaces of different areas exposed to the respective last-named pressure chambers, a fluid pressure-generating pump, fluid-passing lines respectively providing communication between the pump and the first reservoir during each suction stroke of the pump and between the pump and the first pressure chamber on pressure strokes of the pump, a fluid passage establishing communication between the first and second pressure chambers, a valve controlling the last-named passage and being openable in response to predetermined fluid pressure in the first pressure chamber, and spring means cooperating with the piston to initially move the latter inwardly of the fluid chamber.

6. Hydraulic apparatus comprising, in combination, a pressure-actuated device having a body, a piston reciprocable relative to the body, said body providing a pair of pressure chambers to which opposed pressure-receiving areas of the piston are respectively exposed and a remote control unit including a body presenting a cylinder, a first and a second fluid reservoir and a fluid chamber, a fluid-passing line providing communication between the fluid chamber and one of the pressure chambers, a fluid-passing line providing communication between the second reservoir and the other pressure chamber, valve means controlling said lines, a work piston reciprocably mounted in the cylinder for movement into and out of the fluid chamber and defining with the cylinder a first and a second pressure chamber, said piston having pressure-receiving surfaces of different areas exposed to the respective last-named pressure chambers, a fluid pressure-generating pump, fluid-passing lines respectively providing communication between the pump and the first reservoir during each suction stroke of the pump and between the pump and the first pressure chamber on pressure strokes of the pump, a fluid passage establishing communication between the first and second pressure chambers, a valve controlling the last-named passage and being openable in response to predetermined fluid pressure in the first pressure chamber, spring means cooperating with the piston to initially move the latter inwardly of the fluid chamber, and hydraulic means cooperating with the piston to move it in opposition to pressure exerted thereon by the spring.

HERBERT E. PAGE.

(References on following page)

REFERENCES CITED

The following references are of record in the file of this patent:

UNITED STATES PATENTS

| Number | Name | Date |
|---|---|---|
| 791,075 | Carpenter | May 30, 1905 |
| 1,054,868 | Preleuthner | Mar. 4, 1913 |
| 1,358,767 | McNeil | Nov. 16, 1920 |
| 1,700,363 | Barrett | Jan. 29, 1929 |
| 1,744,885 | Groene | Jan. 28, 1930 |
| 2,119,416 | Brown | May 31, 1938 |
| 2,200,392 | Goldberg | May 14, 1940 |
| 2,231,963 | Stratton | Feb. 18, 1941 |
| 2,284,228 | Page | May 28, 1942 |
| 2,290,361 | Schettler | July 21, 1942 |

FOREIGN PATENTS

| Number | Country | Date |
|---|---|---|
| 704,657 | Germany | 1941 |
| 43 | Great Britain | 1893 |